(12) United States Patent
Lavigne et al.

(10) Patent No.: US 8,136,759 B2
(45) Date of Patent: Mar. 20, 2012

(54) RETRACTABLE ARTICULATED LANDING GEAR

(75) Inventors: Paul J. Lavigne, Oakville (CA); Barry Levoir, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 917 days.

(21) Appl. No.: 11/570,839

(22) PCT Filed: Jun. 20, 2005

(86) PCT No.: PCT/US2005/021633
§ 371 (c)(1),
(2), (4) Date: Jul. 15, 2008

(87) PCT Pub. No.: WO2006/071263
PCT Pub. Date: Jul. 6, 2006

(65) Prior Publication Data
US 2009/0108131 A1    Apr. 30, 2009

Related U.S. Application Data

(60) Provisional application No. 60/580,934, filed on Jun. 18, 2004.

(51) Int. Cl.
*B64C 25/34* (2006.01)
(52) U.S. Cl. .................................. 244/102 R; 244/102 A
(58) Field of Classification Search ............... 244/100 A, 244/100 C, 100 R, 102 C, 102 R, 102 SL, 244/102 SS
See application file for complete search history.

(56) References Cited

U.S. PATENT DOCUMENTS

| | | | |
|---|---|---|---|
| 2,579,180 A | 12/1951 | Eldred | |
| 4,720,063 A * | 1/1988 | James et al. | 244/102 R |
| 5,429,323 A | 7/1995 | Derrien et al. | |
| 6,327,956 B1 | 12/2001 | Rink | |
| 2003/0029966 A1 | 2/2003 | Derrien et al. | |
| 2003/0111576 A1 | 6/2003 | Reniau | |

FOREIGN PATENT DOCUMENTS

| | | |
|---|---|---|
| DE | 733061 C | 3/1943 |
| EP | 0219724 A1 | 4/1987 |
| EP | 0605292 | 7/1994 |
| WO | WO-0066430 A1 | 11/2000 |

OTHER PUBLICATIONS

Search Report for application No. PCT/US2005/021633 dated Jan. 12, 2007.
W. J. Boyne, "A century of flight: Dec. 2003 Cover Story", Popular Mechanics, Dec. 2003, 7 pages.
"Goodrich Ships First Airbus A380 Landing Gear", http://ir.goodrich.com/phoenix.zhtml?c=60759&p=irol-newsArticle&ID=652244&highlight, Feb. 22, 2004, 2 pages.
European Search Report for Application No. EP 10011136, dated Dec. 14, 2010.

* cited by examiner

*Primary Examiner* — Tien Dinh
*Assistant Examiner* — Michael Kreiner
(74) *Attorney, Agent, or Firm* — Scott D. Wofsy; Edwards Wildman Palmer LLP

(57) ABSTRACT

A landing gear for an aircraft, characterized by upper and lower pintle frame members (38, 40) being connected to a telescoping shock strut (14) in a non-rigid manner that tolerates twisting when reacting to torsional loads applied to the landing gear, and/or by a pitch trim actuator (30) that positions a landing gear truck (16) proportionally to the retraction angle of a shock strut (14) during retraction and extension.

6 Claims, 4 Drawing Sheets

RETRACTABLE ARTICULATED LANDING GEAR

This application is a national phase of International Application No. PCT/US2005/021633 filed Jun. 20, 2005 and published in the English language.

RELATED APPLICATION

This application claims priority of U.S. Provisional Application No. 60/580,934 filed Jun. 18, 2004, which is hereby incorporated by reference in its entirety.

FIELD OF THE INVENTION

The invention herein described relates generally to landing gear for large aircraft and more particularly to an aft retractable articulated landing gear including a multi-wheel truck and a trim actuator.

BACKGROUND

Landing gear for large aircraft heretofore have employed a telescoping shock-absorbing strut to which a multi-wheel truck is attached. In U.S. Published Application No. 2003/0029966, there is disclosed a landing gear structure having a pivot axis that is substantially horizontal and highly offset relative to the axis of the telescopic shock strut, which axis is substantially vertical in the gear-down position. A stated objective of such landing gear structure is to provide a connection structure suitable for transmitting effectively the twisting moments that are generated while the aircraft is turning during taxiing.

The landing gear comprises a leg constituted by the shock strut in which a telescopic shock-absorber rod slides along a sliding axis. The free end of the rod is hinged to a truck rocker beam carrying a wheel set having multiple axles. The shock strut is hinged to a structure of the aircraft and is capable of being pivoted by an associated connection structure about a substantially horizontal axis that is highly offset from the sliding axis of the telescopic rod which is vertical in the gear-down position.

The connection structure is essentially constituted by two panels connecting two axially separate points of the strut to a common axis structure extending along the pivot axis of the strut, in such a manner that in the gear-down position the panels are disposed one above the other. According to said published application, a top panel is connected to the strut via a high attachment which is rigid in twisting, and a bottom panel is connected to the strut via a low attachment which tolerates twisting, thereby allowing the strut to warp to some extent when the aircraft is turning while taxiing. Because of these attachments, the ability of the low attachment between the bottom panel and the strut to tolerate twisting enables the strut to be warped to some extent when the aircraft is turning while taxiing without that harming the stability of the leg, given that the structure of the high attachment is rigid in twisting.

SUMMARY OF THE INVENTION

The present invention provides improvements in landing gear and particularly improvements having particular applicability to a landing gear structure of the type shown in U.S. Published Application No. 2003/0029966. According to one aspect of the invention, and contrary to the teachings of said published application, both an upper and lower pintle frame member are connected to a telescoping strut in a non-rigid manner that tolerates twisting when reacting to torsional loads applied to the landing gear.

According to another aspect of the invention, a pitch trim actuator is provided to position the landing gear truck proportionally to the retraction angle of the shock strut during retraction and extension. This is accomplished by using rotation of a drag brace to reposition the truck beam by means of the pitch trim actuator and a torque link assembly connected between the truck beam and the shock strut. In addition to providing desired retraction/extension control of the truck beam attitude, the attitude position of the truck beam can be determined by monitoring the position of the pitch trim actuator.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
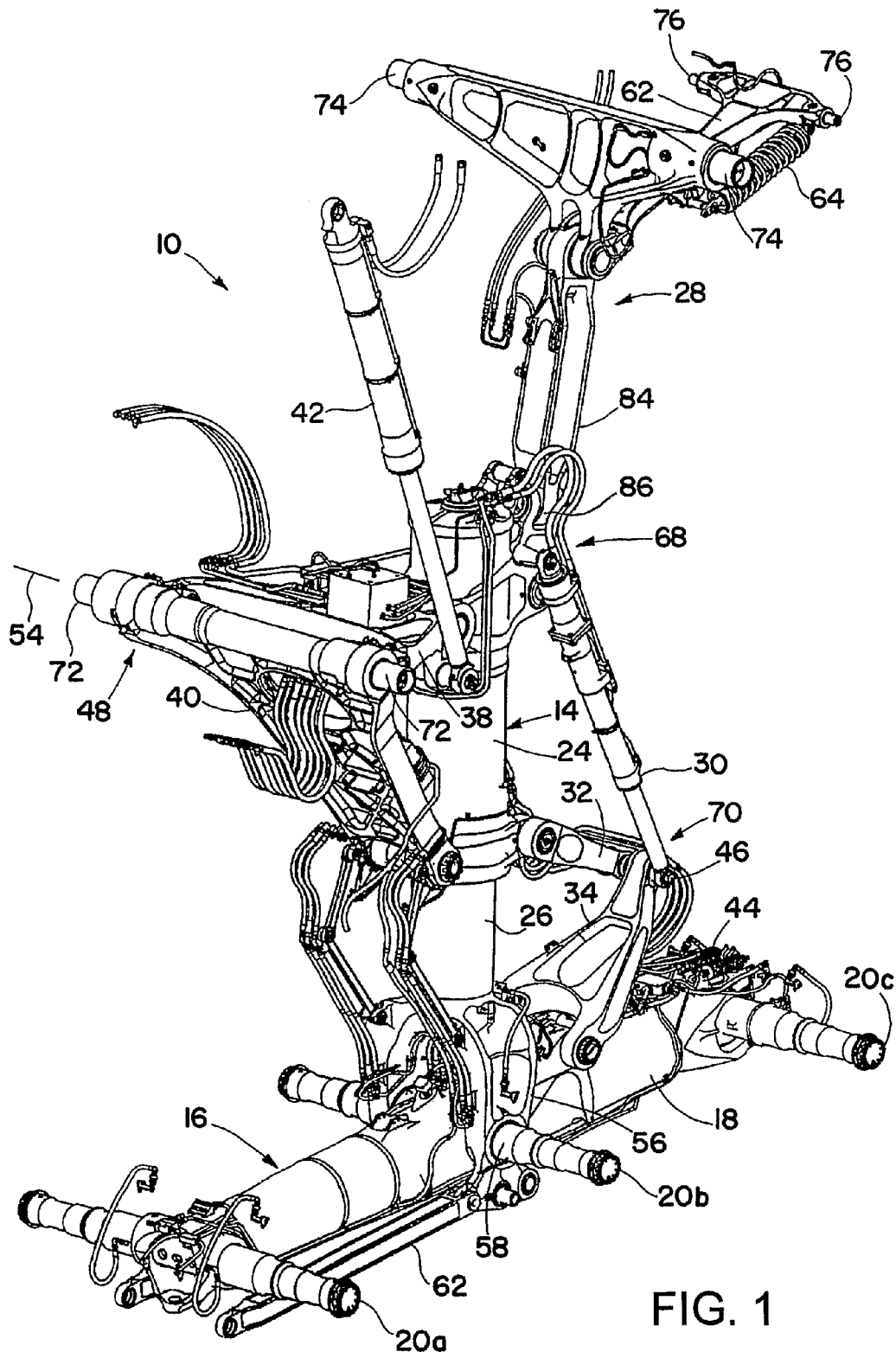
FIG. 1 is a perspective view of a landing gear according to the invention, shown in an extended position.

In FIG. 1, a main landing gear according to the invention is indicated generally at 10. The illustrated landing gear is particularly intended for use as a fuselage-mounted or inboard landing gear in an integrated five-post landing gear system for large multi-wheel aircraft comprising one two-wheeled nose landing gear, two fuselage-mounted, six-wheeled landing gears, and the two wing-mounted, four-wheeled wing landing gears. The landing gear system arrangement performs the following basic functions: (a) to distribute aircraft loads onto the ground, (b) to carry the aircraft during ground maneuvers, (c) to enable effective braking, (d) to contribute to a clean aerodynamic shape in flight, (e) to ensure safe aircraft transition from flight to ground and from ground to flight, (f) to achieve an acceptable passenger and crew comfort during take-off, landing and ground maneuvers, and (g) to contribute to effective ground maneuvering through a steerable inboard mounted landing gear.

The landing gear 10 is a cantilever-type with a shock strut 14 fitted with a multi-wheel truck 16, also referred to herein as a bogie. The truck or bogie 16 includes a truck or bogie beam 18 that carries one or more axles 20 for respective pairs of wheels (not shown). In the illustrated embodiment, three axles 20a, 20b and 20c are employed to provide a six wheel truck, and one of the axles such as the aft axle 20c is steerable. Steering on the aft axle of the bogie beam aids in low speed ground maneuvering.

The shock strut 14 can be of any suitable construction. For example, the shock strut can be a single-stage oleo-pneumatic type in which the nitrogen and oil are unseparated. The shock strut, as is typical, comprises a single piece outer cylinder 24 into which a piston 26 (sliding member) strokes. The shock strut preferably is inclined with an aftward angled rake in the gear down position shown in FIG. 1.

Figure 2:
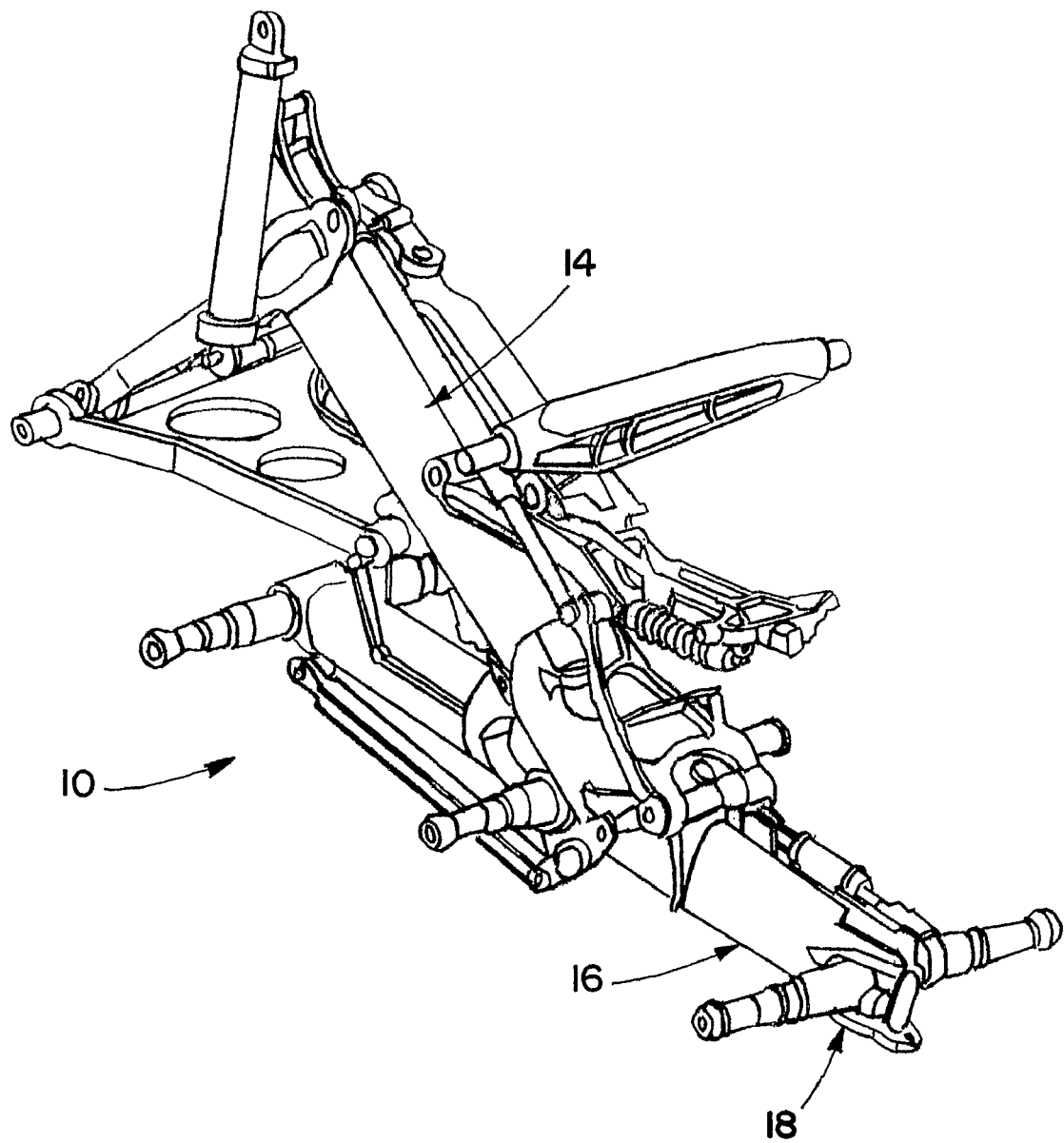
FIG. 2 is a perspective view of the landing gear of FIG. 1, shown in a retracted position.
Figure 3:
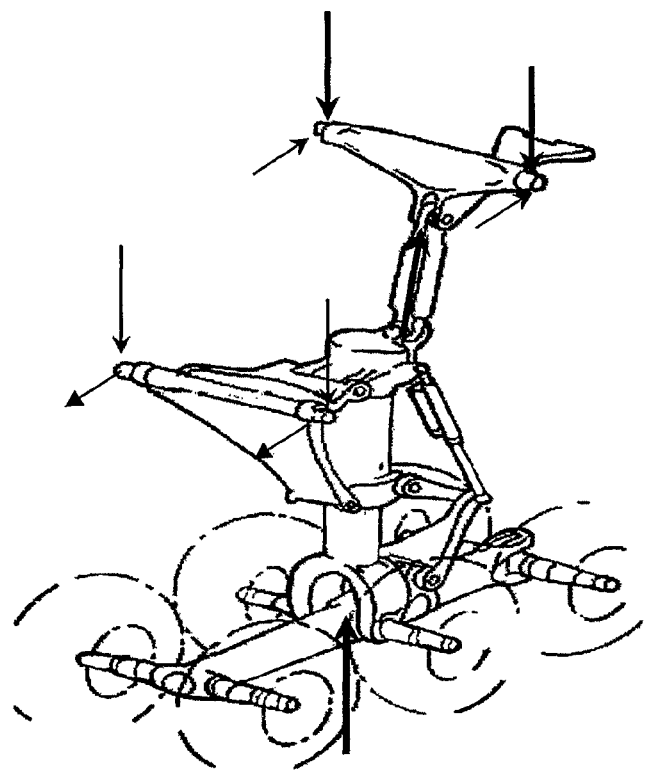
FIG. 3 illustrates vertical load reaction in the landing gear.
Figure 4:
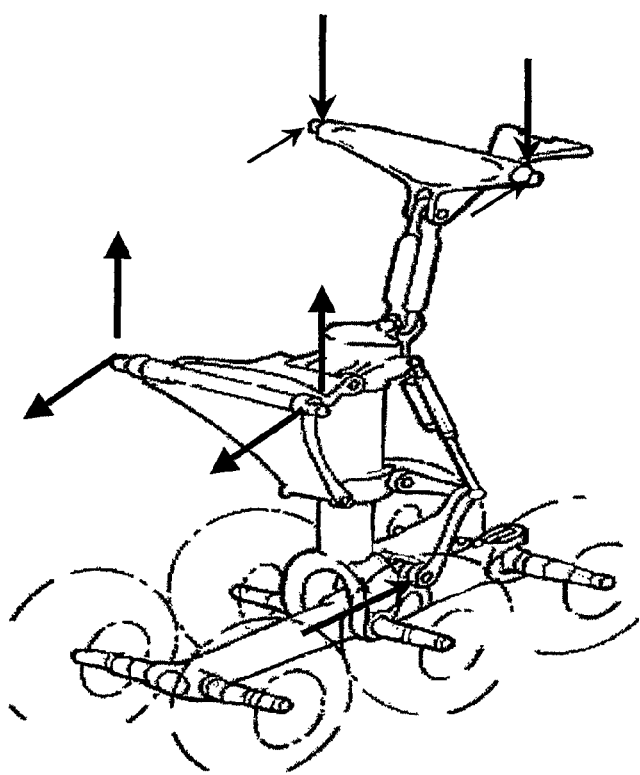
FIG. 4 shows drag load reaction in the landing gear.
Figure 5:
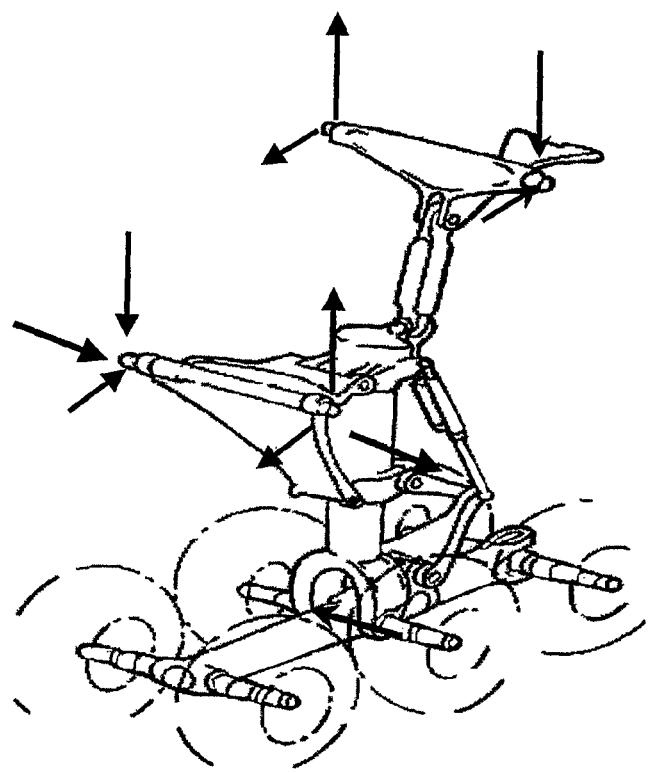
FIG. 5 shows side load reaction in the landing gear.
Figure 6:
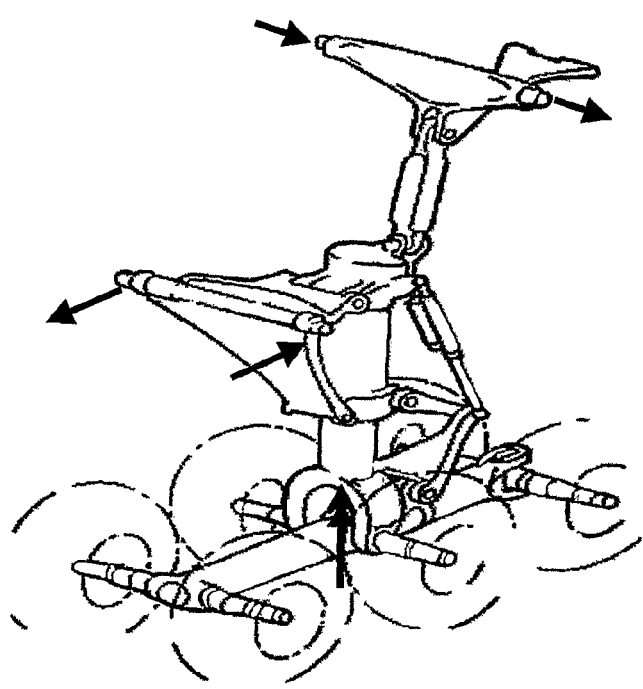
FIG. 6 shows torsional load reaction in the landing gear.

When the landing gear is retracted, the shock strut 14 retracts aftwards to a stowage position shown in FIG. 2. During retraction, the bogie beam 18 is positioned proportional to the shock strut angle to an angle relative to the shock strut centerline. This movement is controlled by rotation of a drag brace assembly 28 acting upon a bogie trim actuator 30 which in turn repositions torque links 32 and 34 to move the bogie beam during retraction. The bogie trim actuator also positions the bogie beam to an angle relative to the front tire down attitude while the gear is down and locked and fully extended.

The landing gear 10 further generally comprises upper and lower pintle frame members 38 and 40. In addition, the landing gear will typically be equipped with a retraction actuator 42 for retracting and extending the landing gear, an unlock actuator (not shown) for locking the landing gear in its extended position during landing and takeoff, a steering actuator (not shown) for steering the aft axle, and a steering unlock actuator and locking mechanism 44 for locking the aft axle in a centered position during high speed maneuvers such as takeoff and landing and for unlocking the aft axle 20c to allow for steering during low speed maneuvers such as taxiing.

The torque links 32 and 34 are attached by suitable pivot connections between the outer cylinder 24 of the shock strut 14 and the bogie beam 18 on the aft side of the shock strut. The torque links transmit pivoting torque from the strut piston 26 and bogie beam to the outer cylinder 24, and into the aircraft via the pintle frame members 38 and 40. The torque links are articulated to accommodate shock strut stroking. More particularly, the torque links are pivotally connected to one another by a pin 16 that also provides for connection of the trim actuator 30 to the torque link assembly.

The outer cylinder 24 of the shock strut 14 attaches the landing gear to the aircraft via the pintle frame members 38 and 40 forming a pintle frame assembly 48. The upper and lower pintle frame members are connected in a non-rigid manner to the outer cylinder 24 of the shock strut, such that they tolerate twisting when reacting to torsional loads applied to the landing gear. The relative amount by which the upper and lower pintle frames react the torsional load can be varied as desired. For example, they can react the load equally (share of 50%), the upper pintle frame could react a higher percentage than the lower, or vice versa. Regardless, the upper pintle frame is not rigidly connected to the the outer cylinder, but rather is pivotally connected in a manner that allows some relative twisting of the upper end of the outer cylinder.

Thus, the outer cylinder 24 of the shock strut 14 is attached to the airframe through a triangulated pintle frame support structure 48, comprising an upper panel 38 and a lower panel 40; a lower link fitting and attachment pins. The triangulated structure is designed to transmit a small proportion of the vertical loads to the airframe; the majority being reacted by the drag brace assembly 28. This structure also reacts the side and torsional loads.

The pintle frame assembly 48 also defines the pivot axis 54 for gear retraction. The pintle frame can be configured as shown to meet stowage and strength requirements, while minimizing overall weight.

The strut piston 26 at its lower end forms a fork 56 to which the bogie beam 18 is attached with a pivot pin 58 which also forms the center axle 20b. The fork is provided with lugs for attachment of brake rods (one shown at 62) for reacting brake torque from brakes (not shown) associated with the wheels.

The above-mentioned retraction actuator 42 can be attached at its lower end to the upper pintle member 38 and its upper end to a gear bay roof structure in the fuselage of the aircraft. Extension of the actuator results in landing gear extension and retraction of the actuator results in landing gear retraction.

The drag brace assembly 28 can be attached at its upper end to gear bay side wall structures in the fuselage, and at its lower end to the shock strut 14. The drag brace assembly rotates as the gear retracts to fold parallel to the shock strut in the fully retracted position shown in FIG. 2. The drag brace assembly can be fitted with a pair of lock links 62 between its center joint and the airframe to form a downlock. A pair of tension springs 64 act between the upper and lower lock links to maintain downlock and to achieve locking under adverse free-fall conditions.

A lock actuator can be incorporated between the lower lock link and the upper drag brace. During landing gear extension the lock actuator extends resulting in a positive locking load (lock-links over-center). During landing gear retraction the lock actuator retracts resulting in positive unlocking load (lock-links pulled out of over-center). The two down-lock springs 64, which are in tension between the upper and lower lock links, ensure that the lock links remain in the over-center position while in the extended position. The springs can be sized to assist the landing gear achieve this state in the event of an alternate extension/free-fall condition.

The landing gear pitch trim actuator 30 is mounted between the drag brace knuckle joint link 68 (an alternate design might have the pitch trimmer mounted to a one piece lower drag brace) and the torque link apex joint 70. The pitch trim actuator serves to position the bogie beam 18 proportional to the retraction angle of the shock strut 14 during retraction and extension. This is achieved by attaching the pitch trim actuator cylinder end to the drag brace which is offset from the drag brace to outer cylinder attachment pin utilizing the drag brace rotation to reposition the bogie beam via the pitch trim actuator and torque link assembly. Due to the movement of the bogie beam during retraction, proximity sensing of bogie position can be achieved by monitoring the position of the pitch trim actuator.

Pressure is maintained on the pitch actuator extend side to position the pitch actuator 30 in the proper position in the landing gear down-and-locked state and during retraction and extension. During landing, the actuator is driven to a retracted position opening a pressure relief valve incorporated within the assembly. The outflow of the actuator is used to fill the volume within the retract cavity of the actuator thereby reducing the outflow to the aircraft hydraulic system.

The pitch actuator 30 preferably is pressurized throughout the entire flight regime in order to ensure proper bogie orientation during retraction, cruise, and approach. Preferably a dedicated hydraulic pressure line to the actuator achieves this.

The illustrated exemplary landing gear interfaces with the airframe at eight main locations: an inboard/outboard main trunnions 72, an inboard/outboard upper drag fitting trunnions 74, inboard/outboard upper lock link trunnions 76, the retract actuator 42, and an uplock fitting.

As will be appreciated, lateral loads applied from the ground point, to the bogie, into the piston fork, are reacted at the bearing areas and reacted by the outer cylinder 24 thru the pintle frame arrangement 48 and the drag brace assembly 28. The pintle frame arrangement can react the torsional load equally or otherwise between the upper and lower pintle frame members providing a structurally stable and optimal weight system.

To achieve a desired stowed position for the wheels, the bogie beam 18 is rotated during retraction about the center axle. The lower drag strut member 84 drives the bogie trim actuator 30 and torque links 32 and 34 as a linkage thus rotating the bogie beam. During retraction the lower drag strut member rotates about an attachment 86 to the outer cylinder. This in turn drives the bogie trim actuator, which is connected to the upper torque link. The lower torque link is attached to the rear end of the bogie beam and the bogie beam rotates to assume the required stowed position.

As will be appreciated, the landing gear 10 can be stowed in the bay by action of the hydraulic retraction actuator, which can be attached to an intermediate bulkhead in the airframe and the top of the outer cylinder. The installation of the retraction actuator can be so arranged that it will retract the landing gear when compressed. On initiation of the retraction sequence the unlock actuator (mounted between lower drag brace and the lower lock strut) is pressurized to shorten and pulls the lock strut over center against the load in the downlock springs 64, and the drag strut is then stowed folded above the shock strut.

The landing gear 10 preferably retracts rearward about the pintle axis. The limit of the retraction angle is controlled by the coordinate of an uplock pin. As this occurs, the upper and lower drag strut members fold and stow above the retracted outer cylinder. The lock strut members fold and extend the downlock springs. The retraction actuator and unlock actuator extend and retract accordingly.

Any suitable interfaces can be used between the outer cylinder and the main structural components (upper and lower panel, drag brace, upper torque link). Typical interfaces are 'socket and clevis' or 'lug and clevis', with a single steel pin. The outer cylinder also supports the shock strut lower bearing and is subject to internal pressure.

With reference to FIGS. 3-6, drag moment ($m_x$) is transferred as differential vertical loading of the pivot lugs to which the bogie beam is coupled. The lower torque link 34 is mounted directly to the bogie beam. As a result, vertical moment is transferred as a couple comprised of the torque links apex load and the pivot side load. The piston 26 supports the shock strut upper bearing and is subject to external/internal differential pressure.

The torque links transfer the vertical moment ($m_z$) from the bogie beam to the outer cylinder.

The drag stay assembly 28 carries most of the vertical load ($f_z$). In addition to this, any drag load induces an axial load in the stay due to the moment arm from the ground line to the main trunnions. The combination of the lower link and the spherical bearing at the apex ensure that the drag stay assembly is only subject to axial loading.

The drag stay assembly 28 is supported by the lock link assembly which is comprised of the two links held over center by the tension springs. The unlock actuator, mounted between the lower lock link and the lower drag stay, pulls the links out of lock during gear retraction.

The pitch trim actuator 30 is mounted between the drag stay lower link and the upper torque link. This actuator is activated to form a rigid link during gear retraction. The actuator is positioned to maintain the gear at a constant attitude relative to the aircraft during the retraction sequence. The pitch trim actuator preferably is always energized (pressurized). The actuator holds the bogie position with the gear extended in flight. The actuator can also be 'over-extended' or 'back-driven' during landing and ground maneuvering.

The pintle frame 48 is made up of the upper and lower panels 38 and 40. The upper panel is subject to a large in-plane moment due to vertical moment ($m_z$). The vertical moment is transferred from the upper torque link to the outer cylinder, then to the upper panel and the lower panel interface, to be reacted at the main trunnions. The upper panel is also subject to significant side load ($f_y$) for turning cases, where the gear outer cylinder acts like an overhanging beam supported at the upper panel and lower panel interfaces. The lower panel is designed by the side loading ($f_y$) due to turning. Significant axial loads occur for drag loading ($f_x$).

The pintle frame assembly and the drag brace assembly is also designed for secondary loads developed by large deformation of the assembly. These secondary loads are developed when a combined vertical and lateral brace loads are introduced into the assembly. These forces are generated from changes in the assembly geometry as loads increase. Of particular interest is the exponential increase in lateral force reaction at the drag brace pintle. This force is developed from lateral kick forces in the lower drag brace as it becomes more inclined. This inclined member resists a vertical force and consequently equilibrium can be achieved through lateral forces (equal and opposite) at each end of the lower drag brace.

The drag brace assembly is designed with sufficient stiffness such that when subjected to high loading conditions the impact of induced secondary loads developed by large deformations of the assembly will not produce an unstable structure for the prescribed loads.

A combined load condition of vertical and lateral drag brace load produce the impact of secondary induced forces on the stability of the overall assembly.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

The invention claimed is:

1. A landing gear for aircraft comprising:
a pitch trim actuator operatively connected to a landing gear truck and a shock strut to position the landing gear truck proportionally to the retraction angle of the shock strut during retraction and extension, wherein the landing gear truck includes a truck beam that carries one or more axles for respective pairs of wheels; and
a torque link assembly including a pair of torque links that are pivotally connected to one another at a pivot connection, wherein the pitch trim actuator is connected to the torque link assembly with the pitch trim actuator and torque link assembly connected between the truck beam and the shock strut for positioning of the truck beam by using rotation of a drag brace assembly connected to the shock strut to reposition the truck beam via the pitch trim actuator and torque link assembly.

2. A landing gear as set forth in claim 1, wherein the pitch trim actuator positions the truck beam to an angle relative to a front tire down attitude while the landing gear is down and locked and fully extended.

3. A landing gear as set forth in claim 1, wherein the pitch trim actuator is configured so that pressure maintained on an extend side of the pitch trim actuator positions the pitch trim actuator in a landing gear down-and-locked state and during retraction and extension.

4. A landing gear as set forth in claim 1, wherein the pitch trim actuator is configured and adapted so that during landing, the pitch trim actuator is driven to a retracted position opening a pressure relief valve incorporated within the landing gear, such that outflow of the pitch trim actuator is used to fill the volume within a retract cavity of the pitch trim actuator thereby reducing the outflow to an aircraft hydraulic system.

5. A landing gear for aircraft comprising:

a pitch trim actuator operatively connected to a landing gear truck and a shock strut to position the landing gear truck proportionally to the retraction angle of the shock strut during retraction and extension, wherein the landing gear truck includes a truck beam that carries one or more axles for respective pairs of wheels; and a torque link assembly including a pair of torque links that are pivotally connected to one another at a pivot connection, wherein the pitch trim actuator is connected to the torque links at the pivot connection with the pitch trim actuator and torque link assembly connected between the truck beam and the shock strut for positioning of the truck beam by using rotation of a drag brace assembly connected to the shock strut to reposition the truck beam via the pitch trim actuator and torque link assembly.

6. A landing gear as set forth in claim 5, wherein the pitch trim actuator is configured so that pressure maintained on an extend side of the pitch trim actuator positions the pitch trim actuator in a landing gear down-and-locked state and during retraction and extension.

* * * * *